(12) United States Patent
Feng

(10) Patent No.: US 11,465,661 B2
(45) Date of Patent: Oct. 11, 2022

(54) FOLDABLE TOOL CART

(71) Applicant: QINGDAO XINZHAN TOOLS CO., LTD, Shandong (CN)

(72) Inventor: Chao Feng, Shandong (CN)

(73) Assignee: QINGDAO XINZHAN TOOLS CO., LTD, Qingdao (CN)

( * ) Notice: Subject to any disclaimer, the term of this patent is extended or adjusted under 35 U.S.C. 154(b) by 118 days.

(21) Appl. No.: 16/953,321

(22) Filed: Nov. 19, 2020

(65) Prior Publication Data

US 2022/0111880 A1 Apr. 14, 2022

(30) Foreign Application Priority Data

Oct. 12, 2020 (CN) .......................... 202011086730.X

(51) Int. Cl.
*B62B 3/02* (2006.01)
(52) U.S. Cl.
CPC ............ *B62B 3/02* (2013.01); *B62B 2202/48* (2013.01); *B62B 2205/30* (2013.01)
(58) Field of Classification Search
CPC ....................................................... B62B 3/02
See application file for complete search history.

(56) References Cited

U.S. PATENT DOCUMENTS

| | | | | |
|---|---|---|---|---|
| 2,016,232 A * | 10/1935 | Floyd | ........................ | B62B 3/02 280/640 |
| 4,998,742 A * | 3/1991 | Maynard | ................... | B62B 3/02 280/47.35 |
| 9,145,154 B1 * | 9/2015 | Horowitz | .................. | B62B 3/02 |
| 9,327,749 B2 * | 5/2016 | Young | ........................ | B62B 5/08 |
| 9,580,095 B2 * | 2/2017 | Vargas, II | ................ | B62B 3/02 |
| 9,738,298 B1 * | 8/2017 | Yang | ....................... | B62B 3/025 |
| 10,099,712 B1 * | 10/2018 | Sun | ......................... | B62B 5/067 |
| 10,633,010 B1 * | 4/2020 | Zhang | .................... | B62B 3/025 |
| 11,091,183 B2 * | 8/2021 | Wu | .......................... | B62B 3/007 |
| 11,293,197 B2 * | 4/2022 | Goldszer | ................. | E04H 15/46 |
| 2017/0259838 A1 * | 9/2017 | Choi | ....................... | B62B 3/007 |
| 2018/0327011 A1 * | 11/2018 | Horowitz | ................ | B62B 5/067 |

\* cited by examiner

*Primary Examiner* — Jonathan Ng
*Assistant Examiner* — James J Triggs

(57) ABSTRACT

A foldable tool cart includes a first bearing assembly, a second bearing assembly, a first support assembly and a second support assembly. The first support assembly and the second support assembly are arranged oppositely and movable toward or away from each other. The first bearing assembly and the second bearing assembly are rotatably connected and are both arranged between the first support assembly and the second support assembly. A side of the first bearing assembly away from the second bearing assembly is connected to the first support assembly. The first bearing assembly is slidable and rotatable with respect to the first support assembly. A side of the second bearing assembly away from the first bearing assembly is connected to the second support assembly. The second bearing assembly is slidable and rotatable with respect to the second support assembly.

10 Claims, 6 Drawing Sheets

FOLDABLE TOOL CART

CROSS-REFERENCE TO RELATED APPLICATIONS

This application claims the benefit of priority from Chinese Patent Application No. 202011086730.X, filed on Oct. 12, 2020. The content of the aforementioned application, including any intervening amendments thereto, is incorporated herein by reference in its entirety.

TECHNICAL FIELD

The present application relates to the transportation technology, and more particularly to a foldable tool cart.

BACKGROUND

A tool cart is a movable tool cabinet suitable for safe and appropriate transportation of tools and accessories on the worksite. The tool cart generally includes handlebars, wheels and a structure for loading items, and it brings a lot of convenience for production. However, most of the tool carts have a fixed frame structure, and as a result it is not convenient to store them after use. In addition, a large space is required for occupation.

SUMMARY

Given the above, the present application provides a foldable tool cart, which can be conveniently stored and requires only a small occupation space.

The invention provides a foldable tool cart, comprising:
a first bearing assembly;
a second bearing assembly;
a first support assembly; and
a second support assembly;
wherein the first support assembly and the second support assembly are oppositely arranged and movable toward or away from each other;
the first bearing assembly and the second bearing assembly are rotatably connected and are both arranged between the first support assembly and the second support assembly; a side of the first bearing assembly away from the second bearing assembly is connected to the first support assembly; the first bearing assembly is slidable and rotatable with respect to the first support assembly; a side of the second bearing assembly away from the first bearing assembly is connected to the second support assembly; and the second bearing assembly is slidable and rotatable with respect to the second support assembly;
when the first support assembly and the second support assembly are driven to be close to each other, the first bearing assembly and the second bearing assembly are driven to move upward, respectively with respect to the first support assembly and the second support assembly, so that the first bearing assembly and the second bearing assembly are rotatable with respect to each other and close to each other, thereby folding the first bearing assembly and the second bearing assembly together; and
when the first support assembly and the second support assembly are driven to move away from each other, the first bearing assembly and the second bearing assembly are driven to move downward, respectively with respect to the first support assembly and the second support assembly, so that the first bearing assembly and the second bearing assembly are rotatable with respect to each other and move away from each other, thereby unfolding the first bearing assembly and the second bearing assembly together.

In an embodiment, the foldable tool cart further comprises at least one of a first connector and a second connector;
wherein an end of the first connector is rotatably connected to the first bearing assembly; and the other end of the first connector is slidably connected to the first support assembly, thereby enabling the first bearing assembly to slide and rotate with respect to the first support assembly; and
an end of the second connector is rotatably connected to the second bearing assembly; and the other end of the second connector is slidably connected to the second support assembly, thereby enabling the second bearing assembly to slide and rotate with respect to the second support assembly.

In an embodiment, the first connector comprises a first body and a second body connected to each other; the first body allows the first support assembly to pass through it and is slidable with respect to the first support assembly; and a side of the second body away from the first body is rotatably connected to the first bearing assembly.

In an embodiment, the foldable tool cart further comprises a limit member arranged on the first support assembly;
wherein the limit member abuts against the first bearing assembly to limit a rotation angle of the first bearing assembly with respect to the second bearing assembly.

In an embodiment, the foldable tool cart further comprises a connecting assembly;
wherein an end of the connecting assembly is rotatably connected to the first bearing assembly; and the other end of the connecting assembly is rotatably connected to the second bearing assembly, so that the first bearing assembly is rotatably connected to the second bearing assembly.

In an embodiment, the connecting assembly comprises a first rotating part and a second rotating part connected to each other; a side of the first rotating part away from the second rotating part is rotatably connected to the first bearing assembly; and a side of the second rotating part away from the first rotating part is rotatably connected to the second bearing assembly, so that the first bearing assembly is rotatably connected to the second bearing assembly.

In an embodiment, the first bearing assembly comprises a first connecting rod and a second connecting rod arranged oppositely; an end of the first connecting rod is slidably and rotatably connected to the first support assembly; and
the other end of the first connecting rod is rotatably connected to the second bearing assembly; an end of the second connecting rod is slidably and rotatably connected to the first support assembly; and the other end of the second connecting rod is rotatably connected to an end of the second bearing assembly away from the first connecting rod.

In an embodiment, the first bearing assembly further comprises a first rotating shaft arranged between the first connecting rod and the second connecting rod; and the first connecting rod and the second connecting rod are rotatably connected to the second bearing assembly by the first rotating shaft.

In an embodiment, the foldable tool cart further comprises a movable component; wherein the movable component is arranged at a bottom of the first support assembly and/or at a bottom of the second support assembly, and configured to drive the movement of the first support assembly and/or the second support assembly.

In an embodiment, the foldable tool cart further comprises a handlebar by means of which an external force is applied to drive the first support assembly and/or the second support assembly, wherein the handlebar is arranged on the first support assembly and/or the second support assembly.

Compared to the prior art, the present application has the following beneficial effects.

The application discloses a foldable tool cart, in which the first support assembly and the second support assembly are arranged oppositely and the first bearing assembly and the second bearing assembly are both arranged between the first support assembly and the second support assembly. When the first support assembly and the second support assembly are driven to be close to each other, the first bearing assembly and the second bearing assembly are driven to move upward, respectively with respect to the first support assembly and the second support assembly, so that the first bearing assembly and the second bearing assembly are rotatable with respect to each other and close to each other, thereby folding the first bearing assembly and the second bearing assembly together. When the first support assembly and the second support assembly are driven to move away from each other, the first bearing assembly and the second bearing assembly are driven to move downward, respectively with respect to the first support assembly and the second support assembly, so that the first bearing assembly and the second bearing assembly are rotatable with respect to each other and move away from each other, thereby unfolding the first bearing assembly and the second bearing assembly together. Compared to the existing tool cart with a fixed frame structure, the foldable tool cart of the present application can be folded when it is not in use, so it is convenient to store it and only a small occupation space is needed.

BRIEF DESCRIPTION OF THE DRAWINGS

Advantages and features of the present disclosure will be obvious from the following description in conjunction with the embodiments. It is apparent that the accompanying drawings disclosed below are only some embodiments of the present disclosure. Any other accompanying drawings can be made by those of ordinary skill in the art based on the structure shown in these drawings without sparing any creative efforts.

Figure 1:
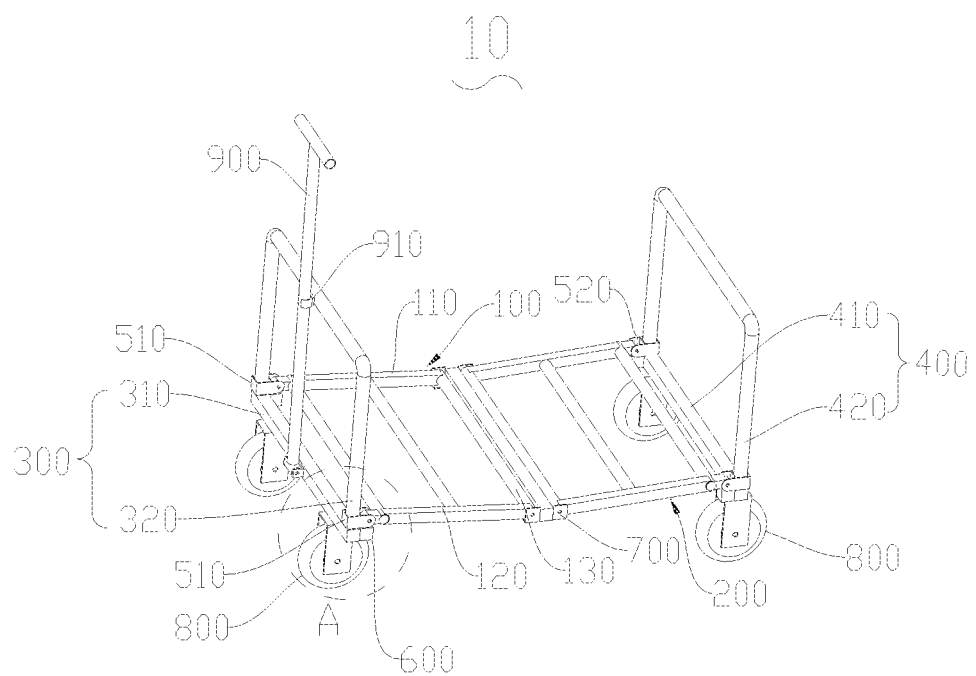
FIG. 1 is a schematic diagram of a foldable tool cart in an unfolded state according to an embodiment of the present disclosure.
Figure 2:
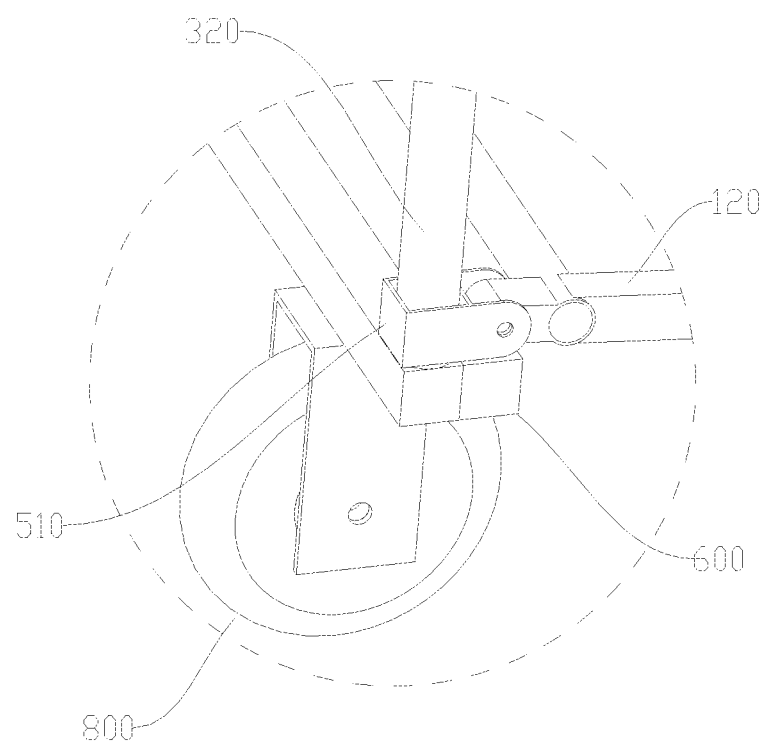
FIG. 2 is an enlarged view of Detail A in FIG. 1.
Figure 3:
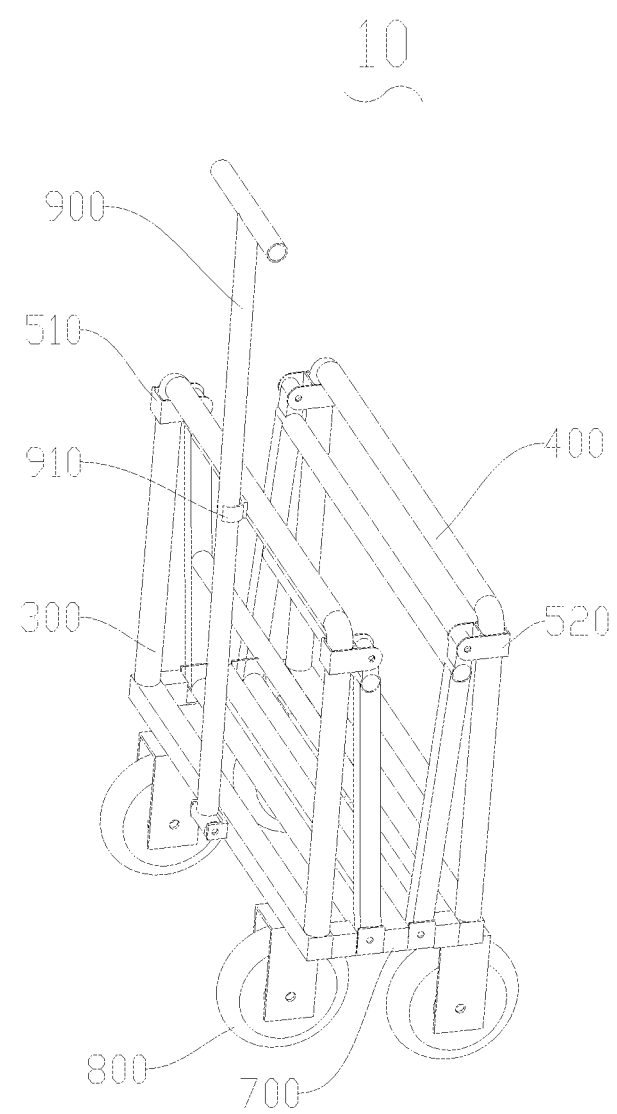
FIG. 3 is a schematic diagram of the foldable tool cart in a folded state according to an embodiment of the present disclosure.

In the drawings. 10, foldable tool cart; 100, first bearing assembly; 110, first connecting rod 110; 120, second connecting rod; 130, first rotating shaft; 200, second bearing assembly; 300, first support assembly; 310, first bottom rod; 320, first support frame; 400, second support assembly; 410, second bottom rod; 420, second support frame; 510, first connector; 511, first body; 512, second body; 5121, first clamp arm; 5122, second clamp arm; 520, second connector; 600, limit member; 700, connecting assembly; 710, third connecting rod; 720, first rotating part; 730, second rotating part; 740, first bottom plate; 750, second bottom plate; 800, movable component; 900, handlebar; 910, fastener; and 920, third connector.

The present disclosure will be further illustrated below with reference to the accompanying drawings, from which the objectives, functions, features and advantages become obvious.

DETAILED DESCRIPTION OF EMBODIMENTS

The present invention will be further clearly and completely described below with reference to the accompanying drawings in embodiments. Obviously, the embodiments disclosed herein are intended to be exemplary. Any other embodiments made by those of ordinary skill in the art based on the embodiments of the present application and sparing any creative efforts shall fall within the protection scope of the present application.

It should be noted that all the terms (such as upper, lower, left, right, front, rear) that indicate directions in the embodiments are only used to explain the relative positions and movements of the components under a specific view (as shown in the drawings). The directional indications of these terms will accordingly change under different views.

In addition, the descriptions relating to "first", "second" and the like in this application are merely illustrative, and are not intended to indicate or imply their relative importance or implicitly indicate the number of technical features. Therefore, the features defined by "first" and "second" may explicitly or implicitly include at least one of the features. Furthermore, the recitation "and/or" in the description includes three solutions, for example, the recitation "A and/or B" includes the technical solution A, the technical solution B and the technical incorporation of A and B. In addition, the technical solutions of various embodiments can be combined, but it is required that these combinations can be implemented by those of ordinary skill in the art. Otherwise, when there is conflict in the combination of technical solutions or it is impossible to combine the technical solution, the combination of the technical solutions is considered to be nonexistent and does not fall within the scope as defined by the appended claims.

In an embodiment, as shown in FIG. 1, a foldable tool cart 10 includes a first bearing assembly 100, a second bearing assembly 200, a first support assembly 300 and a second support assembly 400. The first support assembly 300 and the second support assembly 400 are oppositely arranged and movable toward or away from each other.

The first bearing assembly 100 and the second bearing assembly 200 are rotatably connected and are both arranged between the first support assembly 300 and the second support assembly 400. A side of the first bearing assembly 100 away from the second bearing assembly 200 is connected to the first support assembly 300. The first bearing assembly 100 is slidable and rotatable with respect to the first support assembly 300. A side of the second bearing assembly 200 away from the first bearing assembly 100 is movably connected to the second support assembly 400. The second bearing assembly 200 is slidable and rotatable with respect to the second support assembly 400.

When the first support assembly 300 and the second support assembly 400 are driven to be close to each other, the first bearing assembly 100 and the second bearing assembly 200 are driven to move upward, respectively with respect to the first support assembly 300 and the second support assembly 400. Thus, the first bearing assembly 100 and the second bearing assembly 200 are rotatable with respect to each other and close to each other, thereby folding the first bearing assembly 100 and the second bearing assembly 200 together.

When the first support assembly 300 and the second support assembly 400 are driven to move away from each other, the first bearing assembly 100 and the second bearing assembly 200 are driven to move downward, respectively with respect to the first support assembly 300 and the second support assembly 400. Thus, the first bearing assembly 100 and the second bearing assembly 200 are rotatable with respect to each other and move away from each other, thereby unfolding the first bearing assembly 100 and the second bearing assembly 200 together. Compared to the existing tool cart with a fixed frame structure, the foldable tool cart of the present application can be folded when it is not in use, so it is convenient to store it and only a small occupation space is needed.

In an embodiment, the foldable tool cart 10 further includes at least one first connector 510 having an end rotatably connected to the first bearing assembly 100 and the other end slidably connected to the first support assembly 300, thereby enabling the first bearing assembly 100 to slide and rotate with respect to the first support assembly 300.

Specifically, when the first support assembly 300 and the second support assembly 400 are driven to be close to each other, the first connector 510 is driven to slide upward with respect to the first support assembly 300, and the first bearing assembly 100 is driven to rotate with respect to the first connector 510. When the first support assembly 300 and the second support assembly 400 are driven to move away from each other, the first connector 510 is driven to slide downward with respect to the first support assembly 300, and the first bearing assembly 100 is driven to rotate with respect to the first connector 510.

Figure 5:
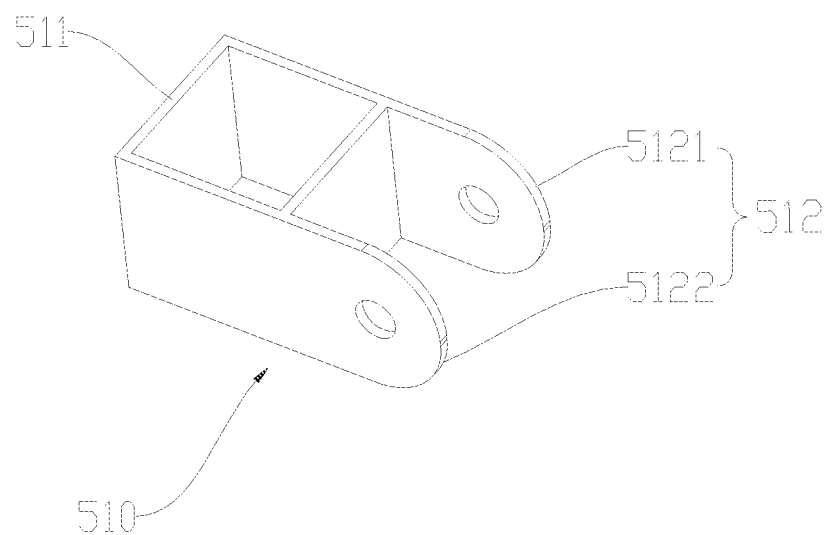
FIG. 5 is a schematic diagram of a first connector according to an embodiment of the present disclosure.

As shown in FIG. 5, the first connector 510 includes a first body 511 and a second body 512 connected to each other. The first body 511 allows the first support assembly 300 to pass through it and is slidable with respect to the first support assembly 300. The second body 512 is rotatably connected to the first bearing assembly 100. In some embodiments, the first body 511 and the second body 512 are integrally formed.

Further, the second body 512 includes a first clamp arm 5121 and a second clamp arm 5122, which are parallelly and spacedly provided at a side of the first body 511 away from the first support assembly 300. The first bearing assembly 100 is rotatably provided between the first clamp arm 5121 and the second clamp arm 5122.

In an embodiment, the first connector 510 includes a plurality of first connectors 510, which are spacedly provided on the first support assembly 300. Specifically, there are two first connectors 510 which are respectively arranged on two sides of the first support assembly 300.

In an embodiment, the foldable tool cart 10 further includes at least one second connector 520 having an end rotatably connected to the second bearing assembly 200 and the other end slidably connected to the second support assembly 400, thereby enabling the second bearing assembly 200 to slide and rotate with respect to the second support assembly 400.

When the first support assembly 300 and the second support assembly 400 are driven to be close to each other, the second connector 520 is driven to slide upward with respect to the second support assembly 400, and the second bearing assembly 200 is driven to rotate with respect to the second connector 520. When the first support assembly 300 and the second support assembly 400 are driven to move away from each other, the second connector 520 is driven to slide downward with respect to the second support assembly 400, and the second bearing assembly 200 is driven to rotate with respect to the second connector 520.

In an embodiment, the second connector 520 includes a plurality of second connectors 520, which are spacedly provided on the second support assembly 400. Specifically, there are two second connectors 520 which are respectively arranged on two sides of the second support assembly 400.

In an embodiment, the first support assembly 300 includes a first bottom rod 310 and a first support frame 320 connected to each other. A side of the first bearing assembly 100 away from the second bearing assembly 200 is connected to the first support frame 320, thus the first bearing assembly 100 is slidable and rotatable with respect to the first support frame 320. An end of the first connector 510 away from the first bearing assembly 100 allows the first support assembly 300 to pass through it and is slidable with respect to the first support assembly 300. Specifically, the first body 511 allows the first support assembly 300 to pass through it and is slidable with respect to the first support assembly 300. More specifically, the first support frame 320 is, but is not limited to, a U-shaped rod.

In some embodiments, the second support assembly 400 includes a second bottom rod 410 and a second support frame 420 connected to each other. The second connector 520 allows the second support frame 420 to pass through it and is slidable with respect to the second support frame 420. A side of the second bearing assembly 200 away from the first bearing assembly 100 is connected to the second support frame 420, thus the second bearing assembly 200 is slidable and rotatable with respect to the second support frame 420. More specifically, the second support frame 420 is, but is not limited to, a U-shaped rod.

In some embodiments, as shown in FIG. 1, the folded tool cart 10 further includes at least one limit member 600 arranged on the first support assembly 300. The limit member 600 can abut against the first bearing assembly 100 to limit a rotation angle of the first bearing assembly 100 with respect to the second bearing assembly 200.

When the foldable tool cart 10 is in the unfolded state, the first bearing assembly 100 is able to load an object. The object placed thereon can apply a vertical force downward onto the first bearing assembly 100, so that the first bearing assembly 100 has a tendency to rotate towards the limit member 600 with respect to the first support assembly 300. However, the limit member 600 can limit the rotation angle of the first bearing assembly 100 with respect to the second bearing assembly 200, whereby the first bearing assembly 100 and the second bearing assembly 200 rotate within a preset angle range. More specifically, the limit member 600 is configured to limit the rotation angle of the first bearing assembly 100 with respect to the second bearing assembly 200 to ensure they are at grade, i.e., an angle formed by the first bearing assembly 100 and the second bearing assembly 200 is 180 degrees. By such arrangement, the first bearing assembly 100 does not rotate downward under the vertical force with respect to the first support assembly 300, as a result, the first bearing assembly 100 does not contact the ground and thus hinder the movement of the foldable tool cart 10.

In some embodiments, the limit member 600 is arranged on the first support assembly 300 and abuts against a bottom of the first connector 510. Specifically, the limit member 600 is arranged on the first bottom rod 310. More specifically, the limit member 600 can abut against a bottom of the second body 512.

In some embodiments, the limit member 600 includes a plurality of limit members 600. Specifically, there are four limit members 600 respectively arranged on two ends of the first support assembly 300 and two ends of the second support assembly 400. Specifically, the four limit members 600 are respectively arranged on two ends of the first bottom rod 310 and two ends of the second bottom rod 410.

In some embodiments, the foldable tool cart 10 includes a connecting assembly 700. An end of the connecting assembly 700 is rotatably connected to the first bearing assembly 100, and the other end of the connecting assembly 700 is rotatably connected to the second bearing assembly 200, so that the first bearing assembly 100 is rotatably connected to the second bearing assembly 200.

Figure 6:
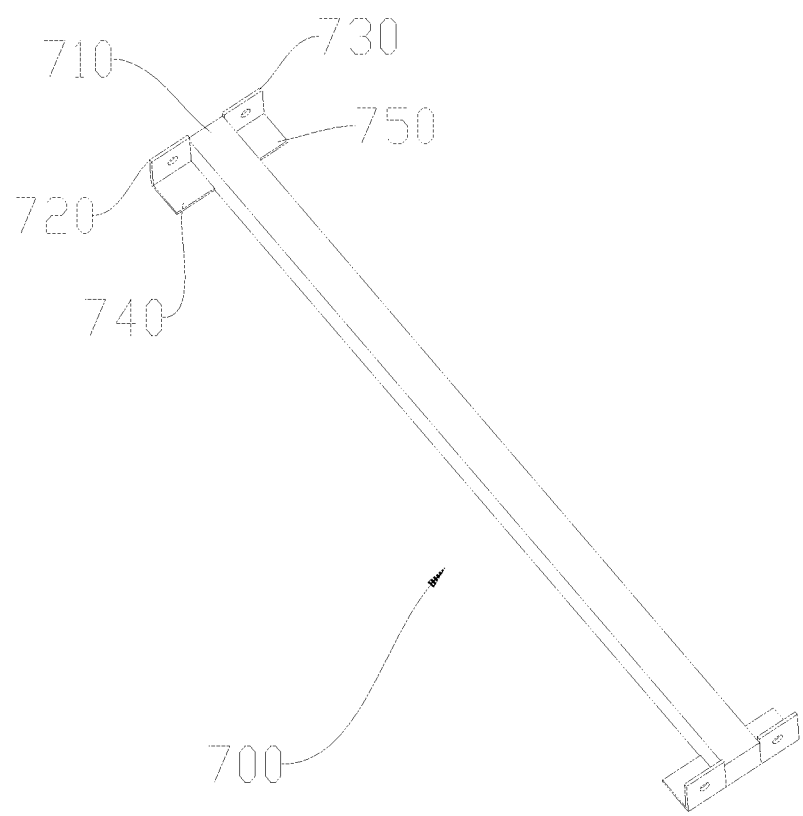
FIG. 6 is a schematic diagram of a connecting assembly according to an embodiment of the present disclosure.

In some embodiments, as shown in FIG. 6, specifically, the connecting assembly 700 includes a first rotating part 720 and a second rotating part 730 connected to each other. The first rotating part 720 is rotatably connected to the first bearing assembly 100, and the second rotating part 730 is rotatably connected to the second bearing assembly 200, so that the first bearing assembly 100 is rotatably connected to the second bearing assembly 200.

More specifically, the connecting assembly 700 includes a third connecting rod 710 configured to load an object. The first rotating part 720 and the second rotating part 730 are respectively arranged on two sides of the third connecting rod 710. The force applied by the object can be shared by the first bearing assembly 100, the second bearing assembly 200 and the third connecting rod 710 together, so that the first bearing assembly 100 and the second bearing assembly 200 are not subjected to all of the load applied by the object to be damaged.

In some embodiments, the connecting assembly 700 further includes a first bottom plate 740 connected to the first rotating part 720. When the foldable tool cart 10 is unfolded, the first bearing assembly 100 abuts against the first bottom plate 740, so as to improve the bearing capacity of the first bearing assembly 100 and the second bearing assembly 200. Specifically, the first bottom plate 740 is perpendicularly welded to the first rotating part 720. Further, the first bottom plate 740 is welded to the third connecting rod 710.

Further, the connecting assembly 700 further includes a second bottom plate 750 connected to the second rotating part 730. When the foldable tool cart 10 is unfolded, the first bearing assembly 100 and the second bearing assembly 200 respectively abut against the first bottom plate 740 and the second bottom plate 750, so as to improve the bearing capacity of the first bearing assembly 100 and the second bearing assembly 200. Specifically, the second bottom plate 750 is perpendicularly welded to the second rotating part 730. Further, the second bottom plate 750 is welded to the third connecting rod 710.

In some embodiments, the first bearing assembly 100 includes a first connecting rod 110 and a second connecting rod 120 arranged oppositely. An end of the first connecting rod 110 is connected to the first support assembly 300 and is slidable and rotatable with respect to the first support assembly 300. The other end of the first connecting rod 110 is rotatably connected to the second bearing assembly 200. An end of the second connecting rod 120 is connected to the first support assembly 300 and is slidable and rotatable with respect to the first support assembly 300. The other end of the second connecting rod 120 is rotatably connected to an end of the second bearing assembly 200 away from the first connecting rod 110.

Specifically, the end of the first connecting rod 110 is slidable and rotatable with respect to the first connector 510. The other end of the first connecting rod 110 is connected to the second bearing assembly 200. The end of the second connecting rod 120 is slidable and rotatable with respect to the first connector 510. The other end of the second connecting rod 120 is connected to the end of the second bearing assembly 200 away from the first connecting rod 110.

Further, the first bearing assembly 100 further includes a first rotating shaft 130 arranged between the first connecting rod 110 and the second connecting rod 120 to connect them. The first connecting rod 110 and the second connecting rod 120 are rotatably connected to the second bearing assembly 200 through the first rotating shaft 130.

In some embodiments, as shown in FIG. 1, the foldable tool cart 10 includes at least one movable component 800 arranged at a bottom of the first support assembly 300 and/or a bottom of the second support assembly 400 to drive the movement of the first support assembly 300 and/or the second support assembly 400. Specifically, the movable component 800 is, but is not limited to, a wheel. Due to the rotation of the wheel, the first support assembly 300 and/or the second support assembly 400 move on the ground with a reduced friction and a higher moving efficiency. More specifically, the movable component 800 is, but is not limited to, a universal wheel. By such arrangement, the first support assembly 300 and/or the second support assembly 400 are movable towards different directions.

Further, four movable components 800 are respectively arranged on a bottom of the first support assembly 300 and/or a bottom of the second support assembly 400. Further, the four movable components 800 are respectively arranged on two ends of the first bottom rod 310 and two ends of the second bottom rod 410.

In some embodiments, the foldable tool cart 10 also includes a handlebar 900 arranged on the first support assembly 300 and/or the second support assembly 400. By means of the handlebar 900, an external force is applied to drive the first support assembly 300 and/or the second support assembly 400 more easily. Specifically, the handlebar 900 is rotatably arranged on the first support assembly 300 and/or the second support assembly 400 to drive them from different directions. More specifically, the handlebar 900 is arranged on the first bottom rod 310 and/or the second bottom rod 410.

Further, the foldable tool cart 10 includes a fastener 910 which is arranged on the first support assembly 300 and/or the second support assembly 400 to detachably fix the handlebar 900 on the first support assembly 300 and/or the second support assembly 400, whereby the handlebar 900 is tightly attached to the first support assembly 300 and/or the second support assembly 400 to reduce a space occupied by the handlebar 900. Specifically, the fastener 910 is arranged at a joint of the first support assembly 300 and the handlebar 900 or at a joint of the second support assembly 400 and the handlebar 900. The fastener 910 is, but not limited to a clamp. The fastener 910 and the handlebar 900 are connected in a snap fit.

Figure 4:
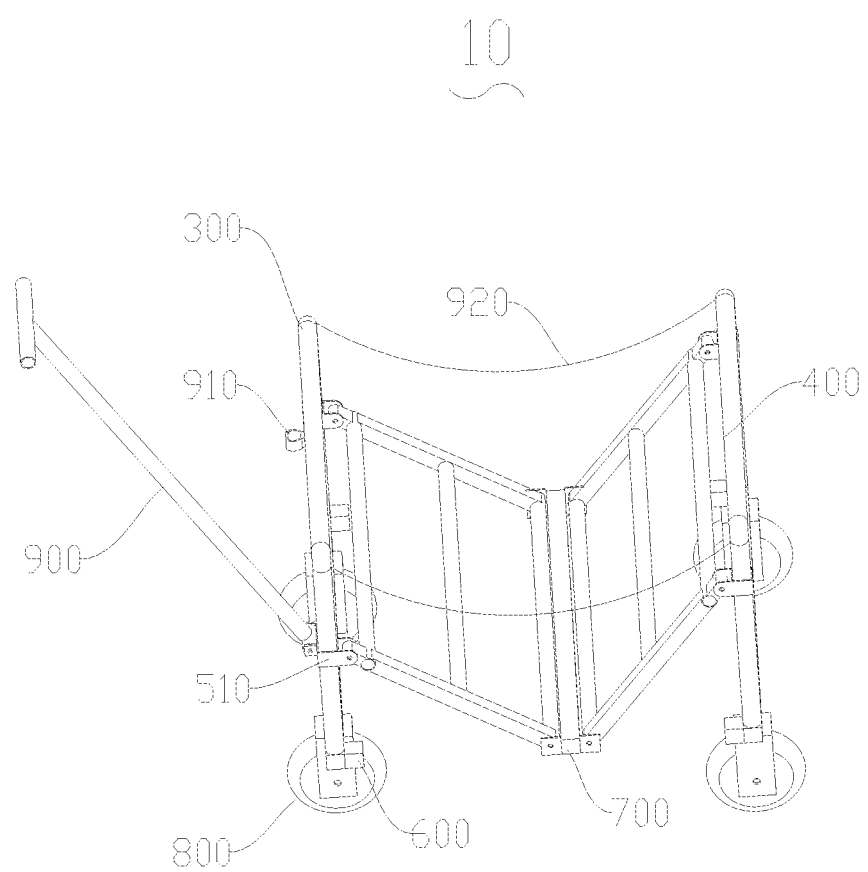
FIG. 4 schematically shows a process of folding the foldable tool cart according to an embodiment of the present disclosure.

In some embodiments, as shown in FIG. 4, the foldable tool cart 10 includes a third connector 920 which is retractable or extendable. An end of the third connector 920 is connected to the first support assembly 300, and the other end of the third connector 920 is connected to the second support assembly 400. The third connector 920 is configured to control a distance of the first support assembly 300 and the second support assembly 400 within an appropriate range.

When the foldable tool cart 10 is in the unfolded state and moves, the third connector 920 can fix the first support assembly 300 and the second support assembly 400, so that they are not separated from each other to become damaged. Specifically, the third connector 920 is, but is not limited to, a rope. More specifically, the third connector 920 is, but is not limited to, a steel wire rope. By the steel wire rope, the first support assembly 300 and the second support assembly 400 in the unfolded state are more stably fixed.

Described above are only preferred embodiments of the present disclosure, which are not intended to limit the scope of the present disclosure. Any changes, equivalent modifications and improvements based on the concept of the present disclosure shall fall within the scope of the present disclosure.

What is claimed is:

1. A foldable tool cart, comprising:
   a first bearing assembly;
   a second bearing assembly;
   a first support assembly; and
   a second support assembly;
   wherein the first support assembly and the second support assembly are oppositely arranged and movable toward or away from each other;
   the first bearing assembly and the second bearing assembly are rotatably connected and are both arranged between the first support assembly and the second support assembly; a side of the first bearing assembly away from the second bearing assembly is connected to the first support assembly; the first bearing assembly is slidable and rotatable with respect to the first support assembly; a side of the second bearing assembly away from the first bearing assembly is connected to the second support assembly; and the second bearing assembly is slidable and rotatable with respect to the second support assembly;
   when the first support assembly and the second support assembly are driven to be close to each other, the first bearing assembly and the second bearing assembly are driven to move upward, respectively with respect to the first support assembly and the second support assembly, so that the first bearing assembly and the second bearing assembly are rotatable with respect to each other and close to each other, thereby folding the first bearing assembly and the second bearing assembly together; and
   when the first support assembly and the second support assembly are driven to move away from each other, the first bearing assembly and the second bearing assembly are driven to move downward, respectively with respect to the first support assembly and the second support assembly, so that the first bearing assembly and the second bearing assembly are rotatable with respect to each other and move away from each other, thereby unfolding the first bearing assembly and the second bearing assembly together.

2. The foldable tool cart of claim 1, further comprising at least one of a first connector and a second connector;
   wherein an end of the first connector is rotatably connected to the first bearing assembly; and the other end of the first connector is slidably connected to the first support assembly, thereby enabling the first bearing assembly to slide and rotate with respect to the first support assembly; and
   an end of the second connector is rotatably connected to the second bearing assembly; and the other end of the second connector is slidably connected to the second support assembly, thereby enabling the second bearing assembly to slide and rotate with respect to the second support assembly.

3. The foldable tool cart of claim 2, wherein the first connector comprises a first body and a second body connected to each other; the first body allows the first support assembly to pass through it and is slidable with respect to the first support assembly; and a side of the second body away from the first body is rotatably connected to the first bearing assembly.

4. The foldable tool cart of claim 1, further comprising a limit member arranged on the first support assembly;
   wherein the limit member abuts against the first bearing assembly to limit a rotation angle of the first bearing assembly with respect to the second bearing assembly.

5. The foldable tool cart of claim 1, further comprising a connecting assembly;
   wherein an end of the connecting assembly is rotatably connected to the first bearing assembly, and the other end of the connecting assembly is rotatably connected to the second bearing assembly, so that the first bearing assembly is rotatably connected to the second bearing assembly.

6. The foldable tool cart of claim 5, wherein the connecting assembly comprises a first rotating part and a second rotating part connected to each other; a side of the first rotating part away from the second rotating part is rotatably connected to the first bearing assembly; and a side of the second rotating part away from the first rotating part is rotatably connected to the second bearing assembly, so that the first bearing assembly is rotatably connected to the second bearing assembly.

7. The foldable tool cart of claim 1, wherein the first bearing assembly comprises a first connecting rod and a second connecting rod arranged oppositely;
   an end of the first connecting rod is slidably and rotatably connected to the first support assembly; and
   the other end of the first connecting rod is rotatably connected to the second bearing assembly; an end of the second connecting rod is slidably and rotatably connected to the first support assembly; and the other end of the second connecting rod is rotatably connected to an end of the second bearing assembly away from the first connecting rod.

8. The foldable tool cart of claim 7, wherein the first bearing assembly further comprises a first rotating shaft arranged between the first connecting rod and the second connecting rod; and the first connecting rod and the second connecting rod are rotatably connected to the second bearing assembly by the first rotating shaft.

9. The foldable tool cart of claim 1, further comprising a movable component; wherein the movable component is arranged at a bottom of the first support assembly and/or at a bottom of the second support assembly, and configured to drive the movement of the first support assembly and/or the second support assembly.

10. The foldable tool cart of claim 1, further comprising a handlebar by means of which an external force is applied to drive the first support assembly and/or the second support assembly, wherein the handlebar is arranged on the first support assembly and/or the second support assembly.

* * * * *